(No Model.)
L. E. WATERMAN.
COTTON SEED PLANTER.
No. 416,385. Patented Dec. 3, 1889.
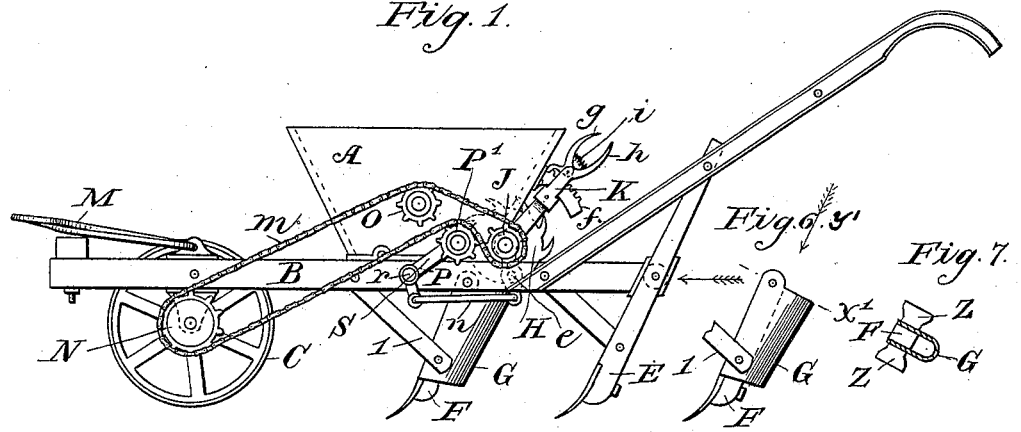
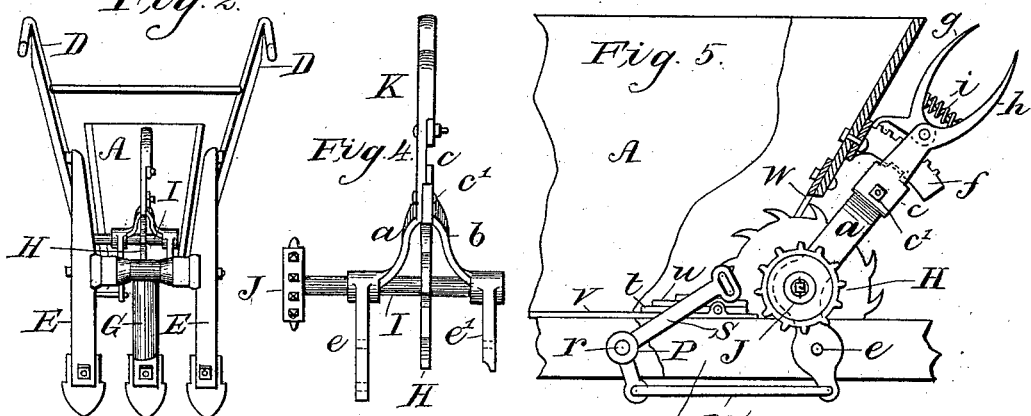
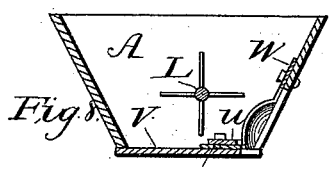
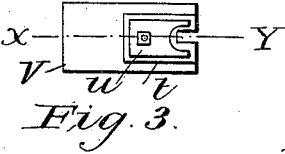
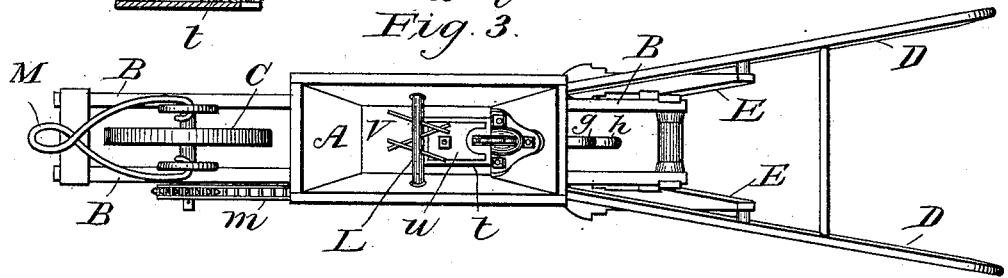
Witnesses:
J. R. Grassley
A. M. Rosenfield
Inventor:
L. E. Waterman
per N. B. Farrett atty.

UNITED STATES PATENT OFFICE.

LEWIS E. WATERMAN, OF MOLINE, ILLINOIS.

COTTON-SEED PLANTER.

SPECIFICATION forming part of Letters Patent No. 416,385, dated December 3, 1889.

Application filed September 29, 1888. Serial No. 286,804. (No model.)

*To all whom it may concern:*

Be it known that I, LEWIS E. WATERMAN, residing at Moline, in the county of Rock Island and State of Illinois, have invented a new and useful Improvement in Cotton-Seed Planters, of which the following is a specification, reference being had to the annexed drawings, making a part of this application.

Figure 1 is a side view of a machine embodying my invention. Fig. 2 is a rear view as seen in direction of the arrow in Fig. 1. Fig. 3 is a top view of the same. Figs. 4, 5, 6, 7, 8, and 9 are views of detached portions of the same, and will be hereinafter fully set forth.

In the accompanying drawings, A represents the hopper or seed-box for retaining the seed placed therein to be sown; B B, the supporting-beams; C, the carrying-wheel; D D, the handles; E E, the rear shovel-standards; F, the seeding-standard; G, the seed tube or conveyer; H, the feeding-wheel turning with the shaft I, to the outer end of which is mounted the driving sprocket-wheel J, Fig. 4.

K is an adjustable lever for throwing the feeding-wheel back and forth to regulate the amount of seed sown to the acre.

L is the agitator for throwing the seed in the hopper back to the feeding-wheel.

M is the draft-bail.

N is the driving sprocket-wheel; O, the wheel for driving the agitator; P', the chain-tightening wheel.

The adjustable lever K, a side view of which is shown in Fig. 5, is composed of two parts or prongs $a$ and $b$, joined together at $c$ by the bolt $c'$, Figs. 4 and 5, where they are shown on an enlarged scale. Through the hubs of these two prongs the feeding-wheel shaft, carrying the driving sprocket-wheel J, turns the prongs of the lever, being pivoted to the inside of the supporting-beams B B at the points $e$ and $e'$. As the said lever K is moved back and forth by the hand of the attendant upon the pivots $e$ and $e'$, the feeding-wheel H is made to withdraw more or less from or out of the seed-box, its teeth engaging with more or less of the seed in the seed-box, and in this manner the amount of seed sown is regulated at the will of the attending operator. By means of the rack $f$, pawl $g$, and spring $i$ the lever is made to remain rigidly in the position placed by the attendant. It will be seen that as this lever is moved back and forth the driving-chain $m$ from the front sprocket-wheel N will require a varying take-up or tightener to compensate for the varying length required to keep the chain reasonably taut in all positions which the wheel J may assume. This is provided for by the automatic tightener-wheel P', for tightening the chain. As the lever K is moved back and forth, it is evident that by means of the connecting-rod $n$, and elbowed lever $p$, pivoted at $r$, the outer end $s$, carrying the tightening-wheel, will raise and lower, and by a proper proportion of these levers the travel of the tightening-wheel is made to assume a path of motion just in keeping with the requirements of the chain to keep it of uniform tension.

At the outer end of the upper arm $s$ of the elbowed lever a transverse slot is made, so that the tightening-wheel P' may be set relatively with said arm, so as to accommodate it to the varying length of the chain caused by wearing of the links. This wheel turns upon a stud having a jam-collar and through-bolt with nut by which it may be secured at any point in the slot.

Upon the inside of the seed box or hopper is an iron plate $w$, Fig. 5, bolted to the end board and shaped in conformity to the circle of the feeding-wheel, so that only about the length of the teeth of the wheel can protrude beyond the interior face of the plate. When the lever K is thus moved backward, the teeth will be more or less withdrawn from contact with the seed and a less quantity of it be sown.

A rubber cut-off $t$ is placed on the bottom of the hopper and slotted to let the feeding-wheel pass through, and over this is an iron plate $u$, bolted to hold the rubber in position. The object of the rubber is to prevent the seed getting cut or injured by the feeding-wheel. As the seed is carried down through this rubber cut-off $t$, it is dropped into the upper end of the seed-tube G, and by it conveyed to the furrow immediately in the rear of the shovel at the lower end of the standard, the latter being suitably supported midway between the two beams B B by means of intermediate spools or thimbles z z, adapted to hold the upper end rigidly in position directly under the feeding-wheel H. The lower end of the standard F is sustained in an inclined position by means of a brace 1 on each side bolted to the beams B B.

The seed-tube G is formed, as shown in Figs. 6 and 7, of a piece of sheet-iron bent into a U-form and clamped to the two sides of the standard at the lower end by the braces 1 1, and at the upper end by the spools or thimbles z z.

Fig. 7 is a plan upon the line $x'$ in Fig. 6 as viewed in direction of the arrow $y'$. Fig. 8 shows a partial section on line $x\ y$ of Fig. 9, the hopper detached from the machine, the agitator L, rubber cut-off $t$, and hold-down plate $u$ in position. Fig. 9 shows a plan of the hopper-bottom with the rubber cut-off $t$ and the iron plate $u$ in working position.

It will be seen that the seed-tube G, in connection with the shovel-standard F, is exceedingly simple and substantial and well adapted to receive the cotton-seed from the feeding-wheel and to convey it to the furrow made by the shovel on the standard F.

I claim—

1. In a cotton-seed planter, the pivoted adjustable lever K, in combination with the feeding-wheel H, plate $w$, and the self-adjusting compensating chain-tightener P, substantially as and for the purposes set forth.

2. In a cotton-seed planter, the seed-tube G, firmly secured to the two opposite sides of a parallel-sided shovel-standard F by means of braces 1 1 and thimbles $z\ z$, substantially as set forth.

3. In a cotton-seed planter, in combination with an adjustable feed-wheel for gaging the amount of seed sown and carrying upon its shaft a chain-wheel driven by an endless chain, and an automatic take-up or tightener for taking up the slack in the driving-chain caused by the forward and backward movement of the feed-wheel shaft, substantially as set forth.

4. In a cotton-seed planter, a feeding-wheel journaled upon an adjustable lever, which latter is pivoted eccentric to the center of the feeding-wheel, and having, in combination with said pivoted lever, a forward-and-backward movement relatively to the hopper, for the purposes set forth.

LEWIS E. WATERMAN.

Attest:
W. R. MOORE,
P. S. MCGLYNN.